United States Patent
Sultenfuss et al.

(10) Patent No.: US 10,996,731 B2
(45) Date of Patent: May 4, 2021

(54) BUCK-BOOST CONVERSION IN AN INFORMATION HANDLING SYSTEM

(71) Applicant: Dell Products, L.P., Round Rock, TX (US)

(72) Inventors: Andrew Thomas Sultenfuss, Leander, TX (US); Mitch Anthony Markow, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 230 days.

(21) Appl. No.: 15/658,606

(22) Filed: Jul. 25, 2017

(65) Prior Publication Data

US 2019/0033941 A1    Jan. 31, 2019

(51) Int. Cl.
*G06F 1/28* (2006.01)
*G06F 1/26* (2006.01)

(52) U.S. Cl.
CPC .................. *G06F 1/28* (2013.01); *G06F 1/26* (2013.01); *G06F 1/266* (2013.01)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 6,885,155 B2 | 4/2005 | Speirs et al. | |
| 9,300,015 B2 * | 3/2016 | Chang | G06F 1/263 |
| 9,612,643 B2 * | 4/2017 | Uan-Zo-Li | G06F 1/3234 |
| 2003/0009702 A1 * | 1/2003 | Park | G06F 1/263 |
| | | | 713/300 |
| 2004/0225804 A1 * | 11/2004 | Leete | G06F 1/1632 |
| | | | 710/305 |
| 2005/0052222 A1 * | 3/2005 | Ootani | H02M 3/156 |
| | | | 327/536 |
| 2009/0027034 A1 * | 1/2009 | Sohnis | H05B 33/0848 |
| | | | 323/318 |
| 2011/0012521 A1 * | 1/2011 | Byun | G09G 3/3406 |
| | | | 315/186 |
| 2012/0153856 A1 | 6/2012 | Liu et al. | |
| 2012/0320023 A1 * | 12/2012 | Tsai | G09G 3/003 |
| | | | 345/212 |
| 2013/0020951 A1 | 1/2013 | Pollock et al. | |
| 2013/0191674 A1 * | 7/2013 | Sultenfuss | G06F 1/3206 |
| | | | 713/330 |
| 2013/0321136 A1 * | 12/2013 | Park | D06F 33/00 |
| | | | 340/12.54 |
| 2013/0339757 A1 * | 12/2013 | Reddy | G06F 1/3212 |
| | | | 713/300 |
| 2014/0192103 A1 * | 7/2014 | Ha | G09G 3/2014 |
| | | | 345/691 |
| 2014/0289541 A1 * | 9/2014 | Svendsen | G06F 1/3296 |
| | | | 713/320 |

(Continued)

*Primary Examiner* — Phil K Nguyen
(74) *Attorney, Agent, or Firm* — Fogarty LLP

(57) ABSTRACT

Systems and methods for buck-boost conversion in an information handling system (IHS) are described. In some embodiments, an IHS may include a processor, an embedded controller (EC) coupled to the processor; and a memory coupled to the EC, the memory having program instructions stored thereon that, upon execution, cause the EC to: determine a characteristic of an IHS subsystem; and control a buck-boost converter to modify a voltage provided by a power source based, at least in part, upon the characteristic of the IHS subsystem.

11 Claims, 4 Drawing Sheets

(56) References Cited

U.S. PATENT DOCUMENTS

| | | | |
|---|---|---|---|
| 2015/0126256 A1* | 5/2015 | Jung | G06F 3/005 |
| | | | 455/573 |
| 2015/0154723 A1* | 6/2015 | Wu | G09G 3/3659 |
| | | | 345/522 |
| 2016/0054784 A1* | 2/2016 | Decesaris | G06F 1/3206 |
| | | | 713/320 |
| 2017/0115710 A1* | 4/2017 | Jain | G06F 1/26 |
| 2018/0255225 A1* | 9/2018 | Yu | G09G 3/3406 |

* cited by examiner

BUCK-BOOST CONVERSION IN AN INFORMATION HANDLING SYSTEM

FIELD

The present disclosure generally relates to information handling systems, and, more particularly, to systems and methods for buck-boost conversion in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have any number of subsystems, and each subsystem may have different electrical requirements and specifications. For example, a first subsystem (e.g., a host processor) may have a low-voltage topology while a second subsystem (e.g., a high-resolution display) may have a high-voltage topology. Today, designing an information handling system involves selecting either the low-voltage or the high-voltage subsystem for optimization, while the other subsystem suffers attendant power losses.

SUMMARY

Embodiments of systems and methods for buck-boost conversion in an information handling system (IHS) are described. In an illustrative, non-limiting embodiment, an IHS may include a processor, an embedded controller (EC) coupled to the processor, and a memory coupled to the EC, the memory having program instructions stored thereon that, upon execution, cause the EC to: determine a characteristic of an IHS subsystem; and control a buck-boost converter to modify a voltage provided by a power source based, at least in part, upon the characteristic of the IHS subsystem.

In some cases, to determine the characteristic of the IHS subsystem, the program instructions may cause the EC to identify the IHS subsystem or a component of the IHS subsystem. Additionally or alternatively, the program instructions may cause the EC to retrieve a power resource specification of the IHS subsystem from an Advanced Configuration and Power Interface (ACPI) table. Additionally or alternatively, the program instructions may cause the EC to perform an electrical characterization of the IHS subsystem.

To modify the voltage, the program instructions may cause the EC to calculate a multiplier value to be applied to the voltage. The multiplier value may increase or decrease the voltage towards an input voltage specification of the IHS subsystem.

In some case, the program instructions may cause the EC to: determine a characteristic of the power source; and control the buck-boost converter to modify the voltage based, at least in part, upon the characteristic of the power source. The power source may be configured to provide at least two different voltages, and the program instructions, upon execution, may cause the EC to: modify a first voltage provided to the IHS subsystem by a first multiplier value; and modify a second voltage provided to a second IHS subsystem by a second multiplier value, where the first and second voltages are concurrently provided to the IHS subsystem and to the second IHS subsystem, respectively.

The program instructions may also cause the EC to: receive a notification that the IHS subsystem has changed from a first operating state to a second operating state; and control the buck-boost converter to adjust the voltage based, at least in part, upon the change.

For example, the IHS subsystem may include a processor, the first operating state may be a turbo state, and the second operating state may be a non-turbo state. The IHS subsystem may include a display, the first operating state may be high-dynamic range (HDR) state, and the second operating state be a non-HDR state.

The program instructions may cause the EC to: receive a notification that the power source has changed from a first state to a second state; and control the buck-boost converter to modify the voltage based, at least in part, upon the change. In the first state the power source may provide an amount of electrical power above a threshold, and in the second state the power source may provide an amount of electrical power below the threshold.

The program instructions may also cause the EC to determine that the IHS subsystem has been replaced by another IHS subsystem without a reboot of the IHS; determine a characteristic of the other IHS subsystem; and control the buck-boost converter to adjust the voltage and to provide the adjusted voltage to the other IHS subsystem based, at least in part, upon the characteristic of the other IHS subsystem.

In another illustrative, non-limiting embodiment, a method may implement one or more of the aforementioned operations. In yet another illustrative, non-limiting embodiment, a hardware memory storage device may have program instructions stored thereon that, upon execution by an IHS, configure and/or cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
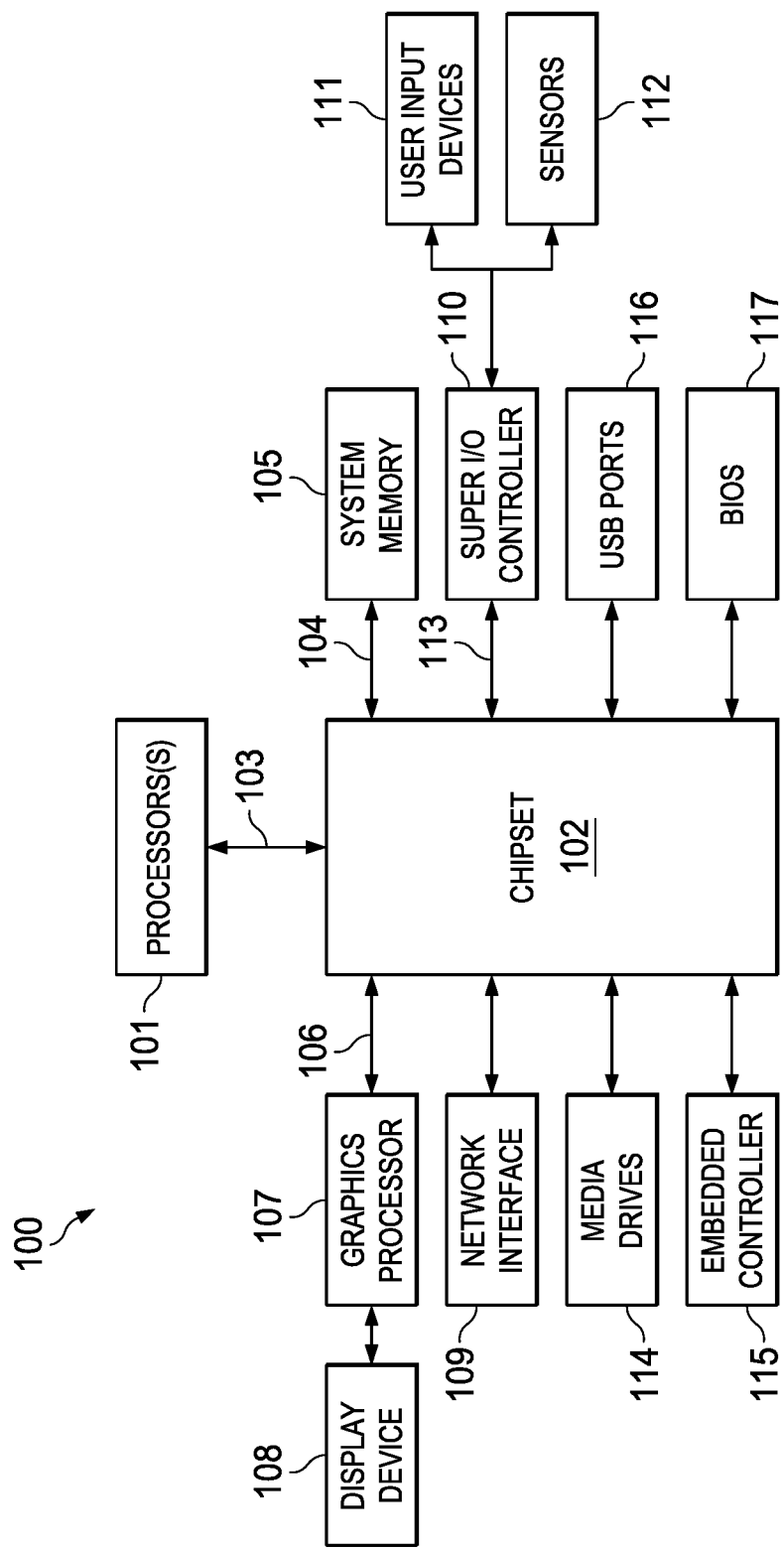
FIG. 1 is a block diagram of a non-limiting example of an information handling system according to some embodiments.

FIG. 1 is a block diagram of a non-limiting example of IHS 100. In various embodiments, systems and methods for buck-boost conversion described herein may be implemented in IHS 100. As shown, IHS 100 may include one or more processors 101. In various embodiments, IHS 100 may be a single-processor system including one processor 101, or a multi-processor system including two or more processors 101. Processor(s) 101 may include any processor capable of executing program instructions, such as any general-purpose or embedded processors implementing any of a variety of Instruction Set Architectures (ISAs).

IHS 100 includes chipset 102 having one or more integrated circuits coupled to processor(s) 101. In certain implementations, chipset 102 utilizes a QPI (QuickPath Interconnect) bus 103 for communicating with processor(s) 101. Chipset 102 provides processor(s) 101 with access to a variety of resources. For instance, chipset 102 provides access to system memory 105 over memory bus 104. System memory 105 may be configured to store program instructions executable by, and/or data accessible to, processors(s) 101. In various embodiments, system memory 105 may be implemented using any suitable memory technology, such as static RAM (SRAM), dynamic RAM (DRAM) or nonvolatile/Flash-type memory.

Chipset 102 may also provide access to Graphics Processing Unit (GPU) 107. In certain embodiments, graphics processor 107 may be disposed within one or more video or graphics cards that have been installed as components of the IHS 100. Graphics processor 107 may be coupled to chipset 102 via graphics bus 106 such as provided by an AGP (Accelerated Graphics Port) bus or a PCIe (Peripheral Component Interconnect Express) bus.

In certain embodiments, chipset 102 may provide access to one or more user input devices 111. In those cases, chipset 102 may be coupled to a super I/O controller 110 that provides interfaces for a variety of user input devices 111, in particular lower bandwidth and low data rate devices.

For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. These I/O devices may interface with super I/O controller 110 through wired or wireless connections. In certain embodiments, chipset 102 may be coupled to super I/O controller 110 via Low Pin Count (LPC) bus 113.

Other resources may also be coupled to the processor(s) 101 of IHS 100 through chipset 102. In certain embodiments, chipset 102 may be coupled to network interface 109, such as provided by a Network Interface Controller (NIC) coupled to IHS 100. For example, network interface 109 may be coupled to chipset 102 via PCIe bus 112. According to various embodiments, network interface 109 may also support communication over various wired and/or wireless networks and protocols (e.g., WiGig, Wi-Fi, Bluetooth, etc.).

In certain embodiments, chipset 102 may provide access to one or more Universal Serial Bus (USB) ports 116. Chipset 102 may further provide access to other types of storage devices. For instance, IHS 100 may utilize media drives 114, such as magnetic disk storage drives, optical drives, solid state drives, or removable-media drives.

Upon powering or restarting IHS 100, processor(s) 101 may utilize instructions stored in Basic Input/Output System (BIOS) or Unified Extensible Firmware Interface (UEFI) chip or firmware 117 to initialize and test hardware components coupled to the IHS 100 and to load an Operating System (OS) for use by IHS 100. Generally speaking, BIOS 117 provides an abstraction layer that allows the OS to interface with certain hardware components that utilized by IHS 100. It is through this hardware abstraction layer that software executed by the processor(s) 101 of IHS 100 is able to interface with I/O devices that coupled to IHS 100.

Chipset 102 also provides access to embedded controller (EC) 115. EC 115 is a microcontroller that handles various system tasks, including tasks that the Operating System (OS) executed by processor(s) 101 does not handle. Typically, EC 101 is kept "always-on."

EC 115 may communicate with chipset 102, GPU 107, and/or processor(s) 101, using any suitable form of communication, including the Advanced Configuration and Power Interface (ACPI), System Management Bus (SMBus), or shared memory. In various implementations, EC 115 may have its own RAM (independent of system memory 105) and its own flash ROM, on which firmware is stored. The EC's firmware includes program instructions that, upon execution by EC 115, cause EC 115 to perform a number of operations for buck-boost conversion in IHS 100, as described in more detail below.

In various embodiments, IHS 100 may include various components in addition to those that are shown. For example, IHS 100 may include a power system with one or more power buses or voltage rails configured to provide electrical power to one or more of components 101-117. Each bus or rail may be coupled to a respective subsystem or power plane, and each subsystem may encompass a subset of one or more of components 101-117.

For example, a first subsystem may include a low-voltage load, such as processor(s) 101, and a second subsystem may include a high-voltage load, such as display 108 (e.g., a high-definition (HD) monitor or high-dynamic range (HDR) liquid crystal display (LCD) with a backlight). In this case, the voltage received by the first subsystem may range from approximately 1 to 5 V, while the second subsystem may require 20 to 200 V or more.

Traditional IHS design requires selecting either the low-voltage or the high-voltage subsystem for power delivery optimization. In contrast, the various systems and methods described herein may satisfy dissimilar power needs from various IHS subsystems using the same range multiplier buck-boost topology for varying load points. As such, these systems and methods may provide a "right size" $V_{in}$ architecture that yields system-wide optimized power, as $V_{in}$ (e.g., the voltage provided to a voltage regulator within a subsystem) is specifically mated for each subsystem or component.

In some cases, a power system as described herein may create a $V_{in}$ range that is near the target value or power specifications for a given subsystem(s). As such, the power system may reduce battery conversion loss to 2% per optimized voltage range. These ranges are flat within the multiplier/divisor, and only reflect battery/cell voltage decline range effects (6-8 V=12-16 V, as an example), providing a battery topology much improved over direct drive.

In some embodiments, IHS 100 may not include all of the components shown in FIG. 1. Moreover, some components that are represented as separate components in FIG. 1 may be integrated with other components. For example, in various implementations, all or a portion of the functionality provided by the illustrated components may instead be provided by components integrated into the one or more processor(s) 101 as a system-on-a-chip (SOC) or the like.

Figure 2:
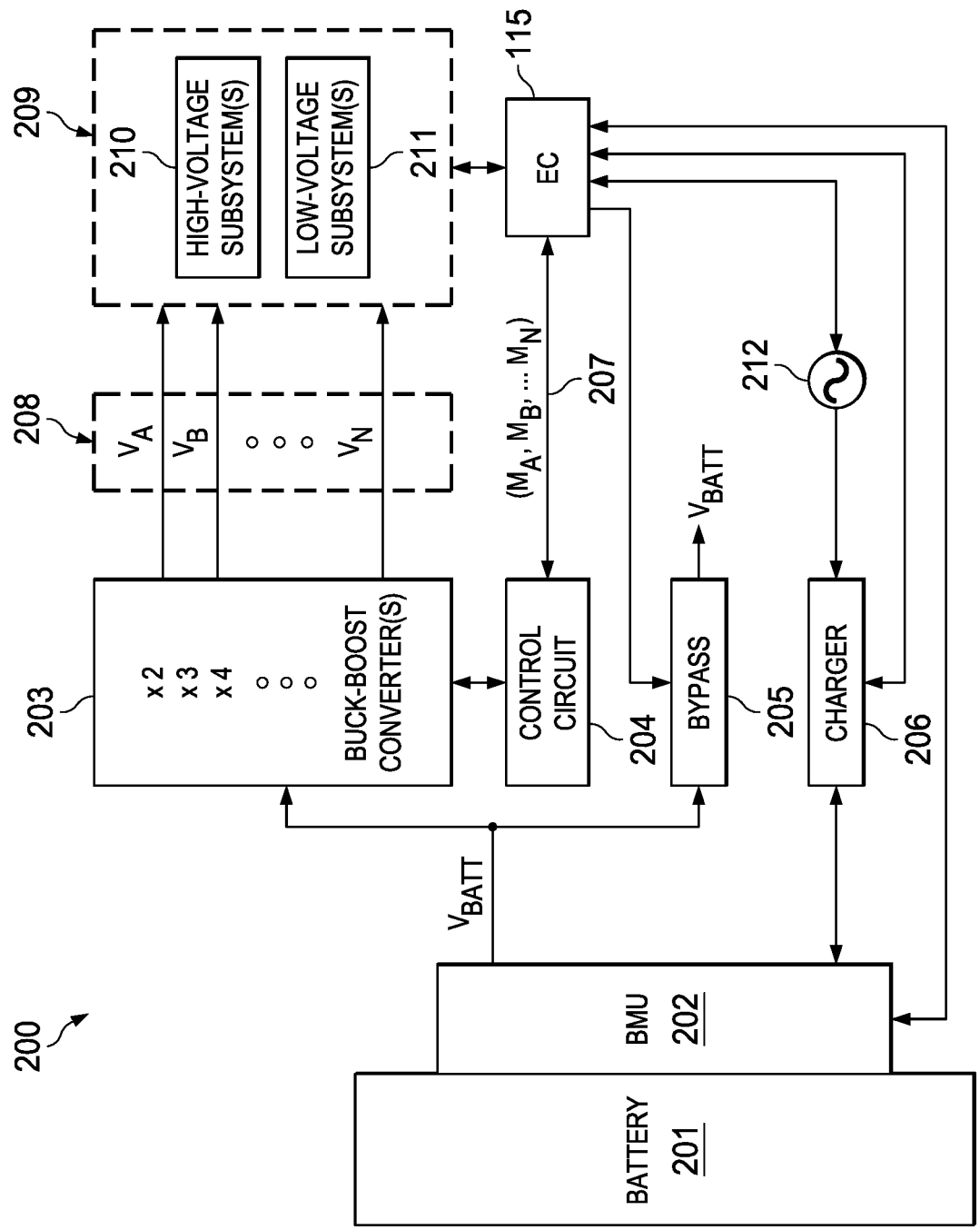
FIG. 2 is a block diagram of a non-limiting example of a power system for buck-boost conversion in an information handling system according to some embodiments.

FIG. 2 is a block diagram of a non-limiting example of power system 200 for buck-boost conversion in IHS 100. As shown, EC 115 is coupled to battery management unit (BMU) 202 of battery 201, charger or DC source 206, bypass circuit 205, AC source 212, control circuit 204 of buck-boost converter 203, and/or other components 209 of IHS 100, including high-voltage subsystem(s) 210 and low-voltage subsystem(s) 211. In various embodiments, EC 115 may be coupled to one or more of the aforementioned elements via chipset 102.

Battery 201 may include one or more cells or cell assemblies. A "cell" is an electrochemical unit that contains electrode(s), separator(s), and/or electrolyte(s). In its simplest form, battery 201 may have a single cell. In many cases, however, battery 201 may multiple cells coupled to each other in series and/or parallel configuration. For instance, battery 201 may have four 3.6 V Lithium-Ion (Li-Ion) or Lithium-Ion Polymer (Li-Polymer) cells coupled in series to achieve a nominal voltage 14.4 V, and two additional batteries coupled in parallel to boost the capacity from 2,400 mAh to 4,800 mAh (incidentally, this particular configuration is referred to as "4s2p," meaning there are four cells in series and two in parallel).

BMU 202 may implement any suitable battery or power supply management system, and it may include a controller, memory, and/or program instructions stored in the memory. The output rail of BMU 202 provides $V_{BATT}$. In operation, BMU 202 may execute its instructions to perform operations such as load balancing, under-voltage monitoring, over-voltage monitoring, safety monitoring, over-temperature monitoring, etc. BMU 202 may also detect whether battery 201 is in charge or discharge mode.

Buck-boost converter 203 may be a DC-to-DC converter that has an output voltage magnitude that is either greater than (boost) or less than (buck) the input voltage. In various implementations, converter 203 may include a switched-mode power supply (SMPS) containing at least two semiconductors (e.g., a diode and a transistor), and at least one energy storage element—a capacitor and/or an inductor. In some cases, converter 203 may include a number of energy storage elements in series, such that nodes between those elements may be used as output terminals. These terminals may be selectively tapped, using switches or the like, to yield a corresponding output voltage that is an integer multiple (or a fraction) of the input voltage.

In some cases, buck-boost converter 203 may have two or more stages. Additionally or alternatively, buck-boost converter 203 may be configured to provide two or more independent voltage conversion rails or channels 208, each feeding a different power bus with a different voltage 208 ($V_A$, $V_B$, $V_N$ ... ). For example, a multi-channel buck-boost converter and/or an array of buck-boost converters may be used.

Control circuit 204 includes one or more logic circuits configured to receive a scalar value 207 (e.g., m) from EC 115, and to control one or more switches of buck-boost converter 203 in order to yield an output voltage 208 equal to $V_{BATT} \times m$. When a multi-channel buck-boost converter 203 is used, each of scalar values 207 ($m_A$, $m_B$, $m_C$, ... ) may be applied to a corresponding rail to yield one of output voltages 208 ($V_A$, $V_B$, $V_N$, ... ), each voltage 208 being a different multiple (or fraction) of $V_{BATT}$. Voltage rail(s) 208 may then be coupled to system 209 and/or to one or more subsystems 210 and 211.

Bypass circuit 205 may include circuitry to bypass buck-boost converter 203 and provide $V_{BATT}$ to any given load. Additionally or alternatively, the value of m applied by buck-boost converter 203 may be selected as "0" or "1", such that output voltage 208 has the same value as $V_{BATT}$.

Charger or DC source 206 may be a power supply unit (PSU), a wall charger, an induction charger, etc. AC source 212 may be any suitable alternating current power source (e.g., provided via an electrical outlet or socket).

System 209 may be IHS 100. High-voltage subsystem 210 may include one or more IHS components 101-117 that operate with a high voltage level (e.g., higher than $V_{BATT}$) and/or at a high-power plane. In some cases, high-voltage subsystem 210 may require a voltage rail of up to 200 V (e.g., a backlit HDR display 108). Conversely, low-voltage subsystem 210 may include one or more IHS components that operate with a low voltage level (e.g., lower than $V_{BATT}$) and/or at a low-power plane. In some cases, low-voltage subsystem 211 may require a voltage rail of down to 1 V (e.g., a processor 101). Generally, each of high-voltage subsystem 210 and low-voltage subsystem 211 may receive a respective unregulated voltage 208, and therefore may include its own voltage regulator.

In operation, system 200 may perform automatic, autonomous, programmatic, on-demand, real-time, and/or dynamic buck-boost conversion in IHS 100. For example, EC 115 may determine a characteristic of high-voltage subsystem 210 and/or low-voltage subsystem 211, and it may control buck-boost converter 203 to modify a voltage (e.g., $V_{BATT}$) provided to subsystem(s) 210 and/or 211 by a power source (e.g., battery 201) based, at least in part, upon the identified characteristic.

For example, EC 115 may identify high-voltage subsystem 210, low-voltage subsystem 211, and/or battery 201 by retrieving a power resource specification of that subsystem from an Advanced Configuration and Power Interface (ACPI) table. Additionally or alternatively, EC 115 may perform an electrical characterization of high-voltage subsystem 210, low-voltage subsystem 211, battery 201, and/or component(s) thereof.

Based upon a comparison between $V_{BATT}$ and the voltage needed by the identified subsystem, EC 115 may calculate suitable m values. For example, if $V_{BATT}$ is 6 V and the power requirement of high-voltage subsystem is 24 V, m would be equal to 4. When the power requirement is a range (e.g., between 18 and 22 V), m may be selected to provide an output voltage value 208 falling within that range (e.g., 20 V). Moreover, when the power requirement of the subsystem is not an integer multiple of $V_{BATT}$ $V_{BATT}$ is 6 V and the subsystem requires a 15 V rail), m may be selected to be below or above that value (e.g., m=2 or 3, respectively), depending upon that subsystem's voltage regulator characteristics (e.g., whether better performance with either under or over-voltage at its input terminals).

In some cases, EC 115 may be coupled to processor(s) 101 and/or GPU 107, for example, via chipset 102. Additionally or alternatively, EC 115 may be coupled directly to subsystem(s) 210 and/or 211.

As such, EC 115 may dynamically change the value of m. For example, EC 115 receive a notification that subsystem(s) 210 and/or 211 have changed from a first operating state to a second operating state, and may control buck-boost converter 203 to adjust voltage 208 in response to the change, during operation of IHS 100, typically without the need for a reboot.

For instance, low-voltage subsystem 211 may include processor 101, the first operating state may be a turbo state, and the second operating state may be a non-turbo state. In this case, processor 101 may require a higher voltage when operating in the first operating state than in the second operating state, and therefore the value of m selected during the first operating state may be larger than the value of m selected during the second operating state.

Additionally or alternatively, high-voltage subsystem 210 may include a backlit display 108, the first operating state may be a high-dynamic range (HDR) state, and the second operating state may be a non-HDR state. In this case, display 108 may also require a higher voltage when operating in the first operating state than in the second operating state, and therefore the value of m selected during the first operating state may be larger than the value of m selected during the second operating state.

Additionally or alternatively, EC 115 may receive a notification that the power source (e.g., battery 201) has changed from a first state to a second state, and it may control buck-boost converter 203 to modify output voltage 208 by selecting a value of m based upon the change. For example, in first state the power source may provide an amount of electrical power below a threshold (e.g., battery 201 is discharged), and, in the second state, the power source may provide an amount of electrical power above the threshold (e.g., battery 201 is charged). Therefore, the value of m selected during the first operating state may be larger than the value of m selected during the second operating state.

Figure 3:
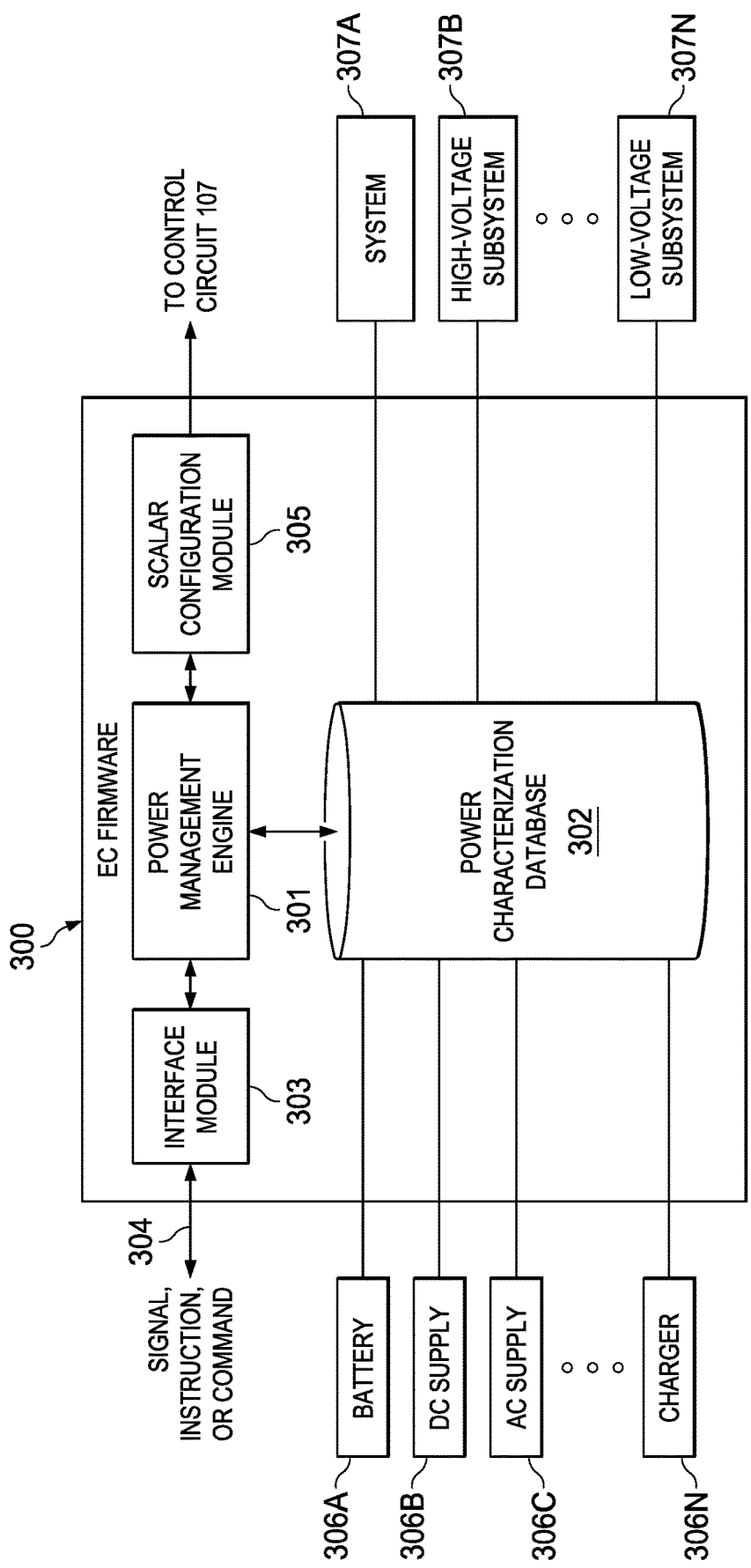
FIG. 3 is a block diagram of a non-limiting example of embedded controller firmware according to some embodiments.

FIG. 3 is a block diagram of a non-limiting example of EC firmware components 300. In some embodiments, program instructions implementing firmware 300 may be executed by EC 115 to perform one or more operations for buck-boost conversion in IHS 100.

As shown, EC firmware 300 includes power management engine 301 coupled to interface module 303 and to scalar configuration module 305. Interface module 303 may be configured to transmit and/or receive any suitable signal, instruction, or command 304 to/from any of a number of components of IHS 100. For example, interface module 303 may be configured to communicate with high-voltage subsystem 210 and/or low-voltage subsystem 211, processor(s) 101, GPU 107, USB ports 116, media drives 114, and/or BIOS 117, for example, using ACPI or SMBus protocols or techniques.

In some cases power management engine 301 may query subsystem(s) 210 and/or 211 for identification information (e.g., SKU, EDID, UID, model number, version, etc.) using interface module 303. Additionally or alternatively, subsystem(s) 210 and/or 211 may provide identification information to power management engine 301 using interface module 303. Additionally or alternatively, power management engine 301 may perform electrical characterization operations upon subsystem(s) 210 and/or 211 via interface module 303.

Power management engine 301 may be configured to receive or generate subsystem identification and/or power characterization information, and to determine a suitable voltage value to be provided to each respective subsystem, for example, from ACPI table(s).

In some cases, a Differentiated Definition Block may describe each device, component, or subsystem handled by ACPI, including a description of what power resources (power planes and/or clock sources) a subsystem needs in each power and/or operating state that the subsystem supports (e.g., a given IHS subsystem may require a high power bus and a clock in the a higher-power state, but only a low-power bus and no clock in a lower-power state). The ACPI table(s) may also list the power planes and clock sources themselves, and control methods for turning them on and off.

The result of the identification and/or characterization operation(s) performed by power management engine 301 may be stored and/or retrieved from/to database 302. As such, database 302 may include any of the aforementioned information for power sources 306A-N (e.g., battery, DC supply, AC supply, charger, etc.), as well as electrical loads 307 (e.g., entire IHS 209, high-voltage subsystem 210, low-voltage subsystem 211, etc.). In some cases, more than one of the same type of source may be present—e.g., two or more batteries.

For each subsystem in its present operating state, power management engine 301 may compare output voltage(s) natively provided by battery 201 against the voltage requirements for that subsystem in that state and at that time. The value of m may be directly or inversely proportional to a ratio between these two voltages or voltage ranges.

Scalar configuration module 305 is configured to switch storage elements on or off within buck-boost converter 203 via control circuit 207 to implement the calculated value of m 207 and to apply that value to $V_{BATT}$, thereby providing output voltage 208.

Figure 4:
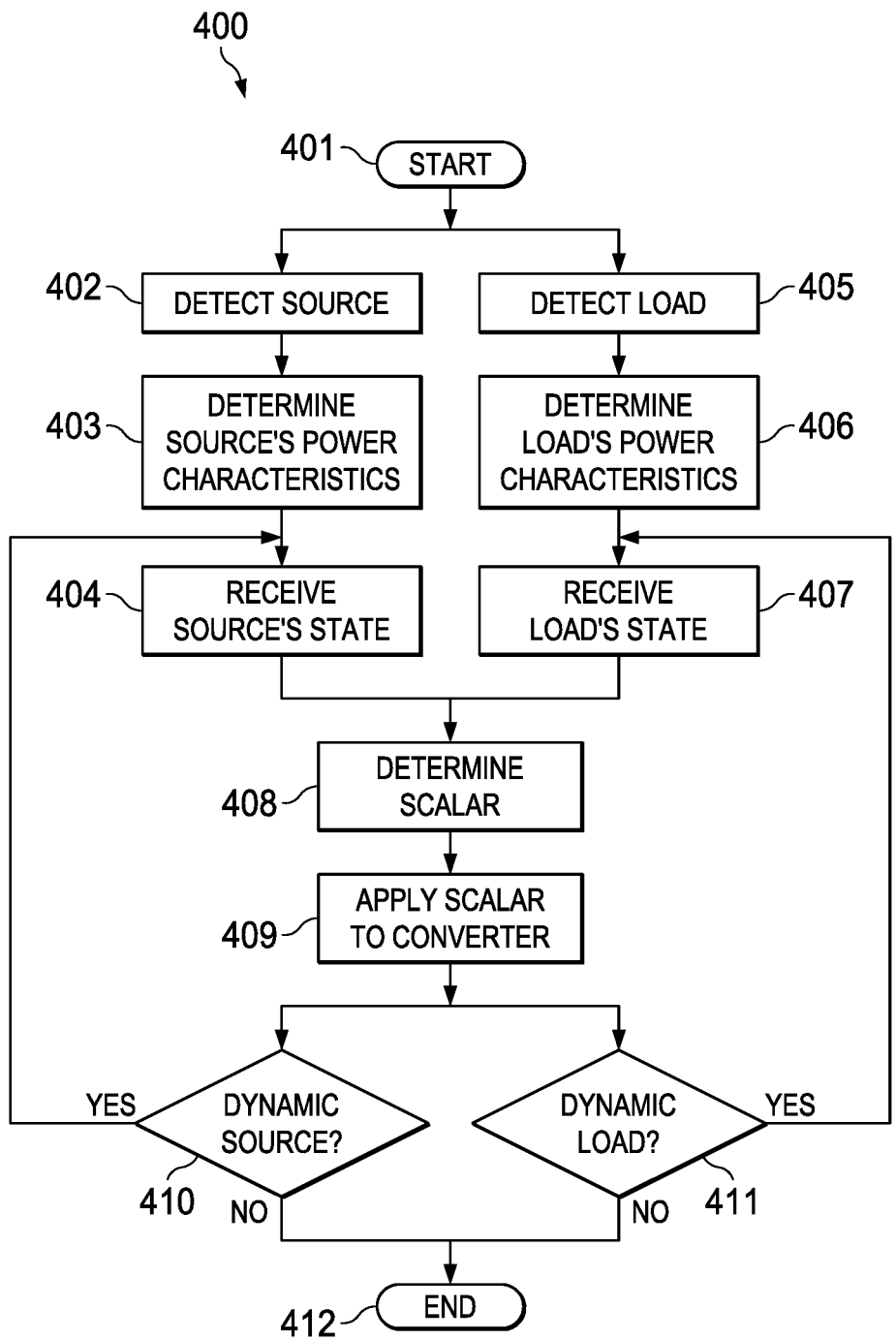
FIG. 4 is a flowchart of a non-limiting example of a method for buck-boost conversion in an information handling system according to some embodiments.

FIG. 4 is a flowchart of a non-limiting example of method 400 for buck-boost conversion. In some embodiments, method 400 starts at block 401 and it may be implemented at least in part through the execution of one or more firmware component(s) 300 by EC 115. At blocks 402 and 405, method 400 may detect a power source 306 and/or load 307 coupled to IHS 100, respectively, for example, based upon information retrieved from an ACPI table or the like. Additionally or alternatively, power sources 30A-N and subsystems 307A-N may be identified.

Particularly, each of power sources 306A-N and subsystems 307A-N may be coupled to a respective power connector, and IHS 100 may detect those connections. In an embodiment, each of power sources 306A-N and subsystems 307A-N may be connected to IHS 100 via a single connector. In another embodiment, however, any of power sources 306A-N or subsystems 307A-N may be connected to IHS 100 using various connectors at the same time.

To identify one or more of power sources 306A-N or subsystems 307A-N at blocks 402 and 405, analog circuitry may be employed to detect and enable each entity. One or more of power sources 306A-N may be "smart" entities that, along with power, provides the source's identity and/or characteristics about the power such as nominal and minimum voltage, maximum current, and/or a variety of other power characteristics. In another example, one or more of the power sources may be "dumb" or legacy source that simply provides power, and method 400 may analyze that power to determine one or more power characteristics such as nominal and minimum voltage, maximum current, etc. Additionally or alternatively, power characteristics may be stored in database 302.

In some cases, at blocks 402 and 405, method 400 may also determine that the power source(s), subsystems 307A-N, and/or IHS 100 are compatible with one another and/or properly configured to use power system 200. The remainder of method 400 assumes that components have successfully negotiated a connection and/or performed a handshake operation. If the handshake fails and/or if a given component rejects another, method 400 may end at block 412. Additionally or alternatively, if one of sources 306A-N is identified and the load(s) are not, operations 405-407 may be skipped. Additionally or alternatively, if one of loads 307A-N is identified and the source(s) are not, operations 402-404 may be skipped.

At blocks 403 and 406, method 400 may detect power characteristics of power source 306A-N and/or loads 307A-N, respectively. For example, blocks 403 and 406 may retrieve power information from an ACPI table or the like.

Alternatively, a plurality of charging characteristics may be determined for battery 201. In some embodiments, block 403 may determine the battery charge level and select a plurality of charging rates for battery 201 that include a minimum charge rate, a maximum charge rate, and/or a plurality of intermediate charge rates between the minimum charge rate and the maximum charge rate. The charging process may include many factors that can impact battery life, and block 403 is operable to consider power source capability, battery charge level, and operation power requirements of system components in determining the charge rate.

Block 403 may retrieve from battery 201, or from database 203, a plurality of battery characteristics that include battery type (e.g., lithium ion, lithium polymer, etc.), battery capacity, and/or a variety of battery characteristics (e.g., number of cells, output rails, etc.). For example, a charge rate desirable for a given battery may require more power than can be provided by a particular power source under desired operation levels of other system components, while a more capable power source may support the optimum charge rate, and the system allows for the characterizations of those variable in determining the charge rate to be supplied to a battery.

In an embodiment, the power characteristics may be for power provided from a single power input. In another embodiment, the power characteristics may be for a total power provided from a plurality of power inputs (e.g., the power characteristics may be determined for a total power provided from a plurality of different power inputs that each provides a discrete power source for IHS 100). In another embodiment, the power characteristics may be power characteristics for power provided from each of a plurality of power inputs (e.g., power characteristics may be determined for each of a plurality of discrete power sources provided from respective power inputs connected to the IHS 100) in order, for example, to select the highest power and/or the optimal power source for IHS 100.

At block 406, a plurality of operation characteristics may be determined for subsystems 210 and/or 211 in IHS 100. Block 406 may determine a plurality of operating levels for subsystems 210 and/or 211 that include a minimum operation level, and maximum operation level, and/or a plurality of intermediate operation levels between the minimum operation level and the maximum operation level. In an embodiment, the determination of operating characteristics for certain processors may include capping their operating power states (P-states) or disabling a "turbo-mode."

Additionally or alternatively, block 406 may retrieve from subsystems 210 and/or 211, or from database 203, a plurality of component characteristics that include, for example, power consumption for processor operating states, memory technology type (e.g., low power, standard, etc.), storage technology type (e.g., solid state, hard disk drive (HDD), etc.), and/or a variety of other component characteristics. Block 406 may then use the component characteristics with the power input characteristics to determine the operation characteristics.

In an embodiment, the operation characteristics may be determined for system 209 operating together. In another embodiment, operation characteristics may be determined for each of subsystems 210 and/or 211 individually.

At blocks 404 and 407, method 400 may identify the source's state and/or the load's state (e.g., number of cells, charge level, turbo, HDR, etc.). In some cases, the source and/or load may operate in a single state, and therefore blocks 404 and/or 405 may be performed only once, or may be skipped altogether.

At block 408, method 400 calculates scalar value(s) 207 to be applied to $V_{BATT}$ by buck-boost converter 203 via control circuit 204. Then, at block 409, method 400 applies scalar value(s) 207 to $V_{BATT}$ to generate output voltage(s) 208.

At block 410, if source 306 is subject to dynamically changing states during operation, control returns to block 404 and the source's current or present state is again processed to calculate scalar value(s) 207 at block 408. Similarly, at block 411, if load 307 is subject to dynamically changing states, control returns to block 407 and the load's current or present state is used to calculate scalar value(s) 207 at block 408. Otherwise, method 400 ends at block 412.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
an embedded controller (EC) coupled to the processor, wherein the EC comprises a microcontroller configured to handle tasks exclusive of other tasks that an Operating System (OS) executed by the processor handles; and
a memory coupled to the EC, the memory having program instructions stored thereon that, upon execution, cause the EC to:
determine a characteristic of an IHS subsystem;
determine a characteristic of a power source;
control a buck-boost converter to modify a voltage provided to the IHS subsystem by the power source, at least in part, by applying a multiplier value to the voltage, wherein the multiplier value comprises a ratio dynamically calculated based upon: (i) changes to the characteristic of the IHS subsystem and (ii) changes to the characteristic of the power source, and wherein applying the calculated multiplier value comprises switching one or more storage elements on or off within the buck boost converter;
receive a notification that the IHS subsystem has switched from a first operating state to a second operating state based upon a power resource specification stored in an Advanced Configuration and Power Interface (ACPI) table, wherein: the IHS subsystem comprises a display, the first operating state is a high-dynamic range (HDR) state of the display, and the second operating state is a non-HDR state of the display; and
control the buck-boost converter to adjust the voltage based, at least in part, upon the notification.

2. The IHS of claim 1, wherein to determine the characteristic of the IHS subsystem, the program instructions, upon execution, cause the EC to identify the IHS subsystem or a component of the IHS subsystem.

3. The IHS of claim 1, wherein to determine the characteristic of the IHS subsystem, the program instructions, upon execution, cause the EC to perform an electrical characterization of the IHS subsystem.

4. The IHS of claim 1, wherein the multiplier value increases or decreases the voltage towards an input voltage specification of the IHS subsystem.

5. The IHS of claim 1, wherein the program instructions, upon execution, cause the EC to:
receive a notification that the power source has changed from a first state to a second state; and
control the buck-boost converter to modify the voltage based, at least in part, upon the change.

6. The IHS of claim 5, wherein in the first state the power source provides an amount of electrical power above a threshold, and wherein in the second state the power source provides an amount of electrical power below the threshold.

7. The IHS of claim 1, wherein the program instructions, upon execution, further cause the EC to:
determine that the IHS subsystem has been replaced by another IHS subsystem without a reboot of the IHS;
determine a characteristic of the other IHS subsystem; and
control the buck-boost converter to adjust the voltage and to provide the adjusted voltage to the other IHS subsystem based, at least in part, upon the characteristic of the other IHS subsystem.

8. A hardware memory storage device having program instructions stored thereon that, upon execution by an embedded controller (EC) of an information handling system (IHS), the EC comprising a microcontroller configured to handle tasks exclusive of other tasks that an Operating System (OS) executed by a processor of the IHS handles, cause the EC to:
determine a characteristic of an IHS subsystem;
determine a characteristic of a power source;
control a buck-boost converter to modify a voltage provided to the IHS subsystem by the power source, at least in part, by applying a multiplier value to the voltage, wherein the multiplier value comprises a ratio dynamically calculated based upon: (i) changes to the characteristic of the IHS subsystem and (ii) changes to the characteristic of the power source, and wherein applying the calculated multiplier value comprises switching one or more storage elements on or off within the buck boost converter;
receive a notification that the IHS subsystem has switched from a first operating state to a second operating state based upon a power resource specification stored in an Advanced Configuration and Power Interface (ACPI) table, wherein: the IHS subsystem comprises a display, the first operating state is a high-dynamic range (HDR) state of the display, and the second operating state is a non-HDR state of the display; and
control the buck-boost converter to adjust the voltage based, at least in part, upon the notification.

9. The hardware memory storage device of claim 8, wherein the characteristic of the power source comprises a specified charge level.

10. A method, comprising:
determining, by a microcontroller of an Information Handling System (IHS) configured to handle tasks exclusive of other tasks that an Operating System (OS) executed by a processor of the IHS handles, a characteristic of an IHS subsystem;
determining, by the microcontroller, a characteristic of a power source;
controlling, by the microcontroller, a buck-boost converter to modify a voltage provided to the IHS subsystem by the power source, at least in part, by applying a multiplier value to the voltage, wherein the multiplier value comprises a ratio dynamically calculated based upon: (i) changes to the characteristic of the IHS subsystem and (ii) changes to the characteristic of the power source, and wherein applying the calculated multiplier value comprises switching one or more storage elements on or off within the buck boost converter;

receiving a notification that the IHS subsystem has switched from a first operating state to a second operating state based upon a power resource specification stored in an Advanced Configuration and Power Interface (ACPI) table, wherein: the IHS subsystem comprises a display, the first operating state is a high-dynamic range (HDR) state of the display, and the second operating state is a non-HDR state of the display; and controlling the buck-boost converter to adjust the voltage based, at least in part, upon the notification.

11. The method of claim 10, wherein the characteristic of the power source comprises a specified charge level.

* * * * *